Dec. 16, 1958  G. J. CHESNA ET AL  2,864,647
VEHICLE BODY-FRAME CONSTRUCTION
Filed Oct. 12, 1956  3 Sheets-Sheet 1
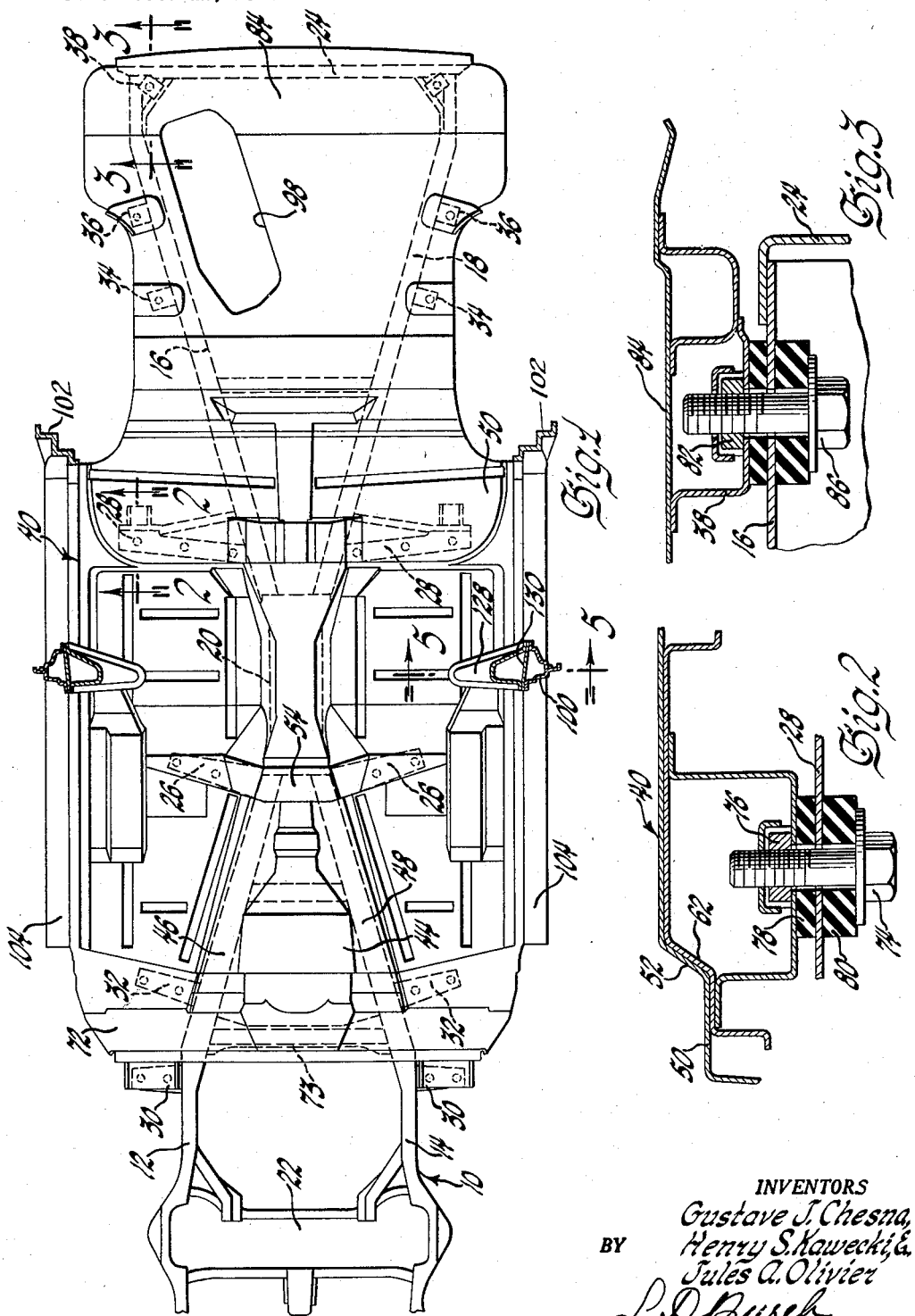
INVENTORS
Gustave J. Chesna,
BY  Henry S. Kawecki, &
Jules A. Olivier
L.D. Burch
ATTORNEY Dec. 16, 1958  G. J. CHESNA ET AL  2,864,647
VEHICLE BODY-FRAME CONSTRUCTION
Filed Oct. 12, 1956  3 Sheets-Sheet 2
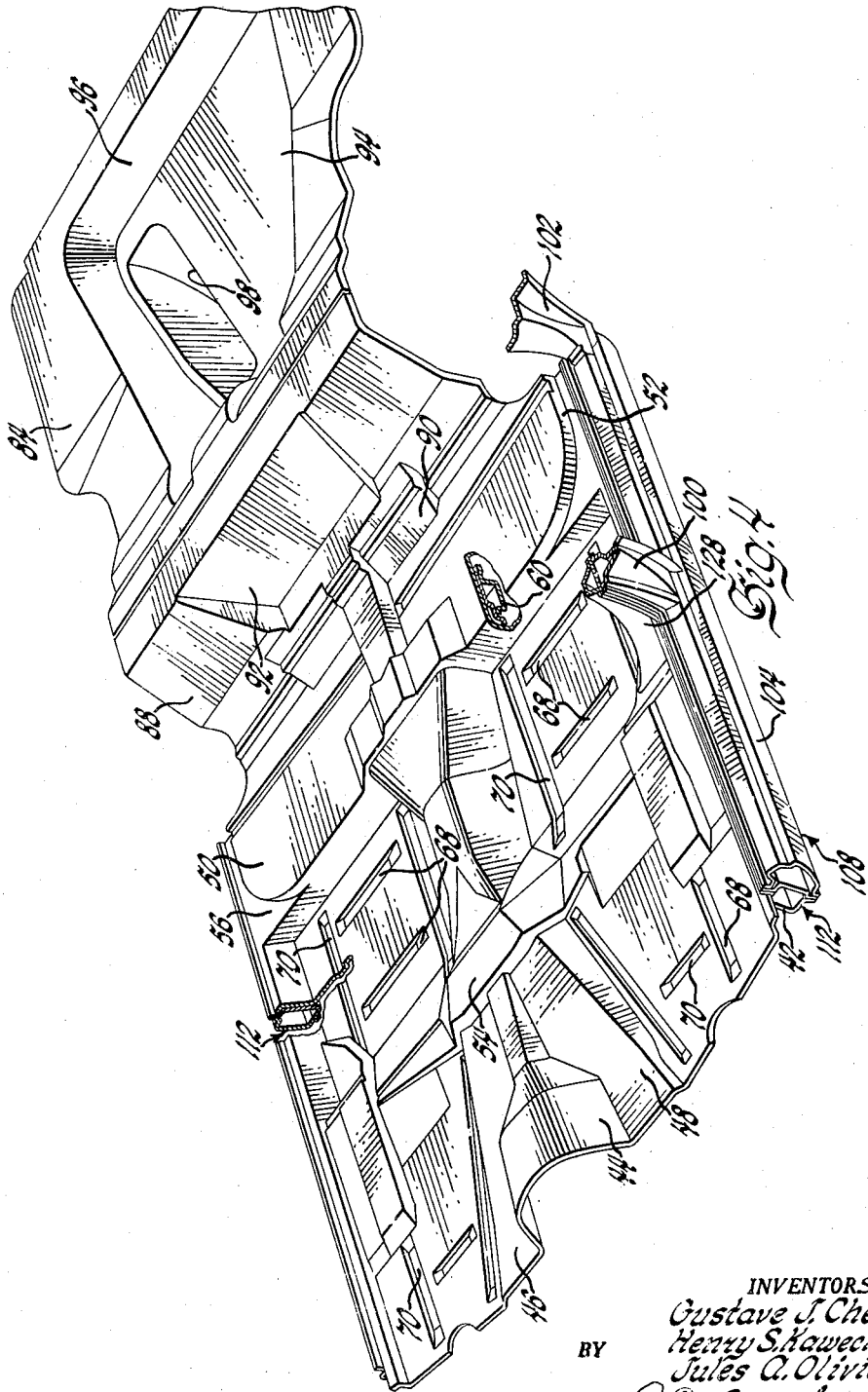
INVENTORS
Gustave J. Chesna,
Henry S. Kawecki, &
Jules A. Olivier
BY
L. D. Buck
ATTORNEY

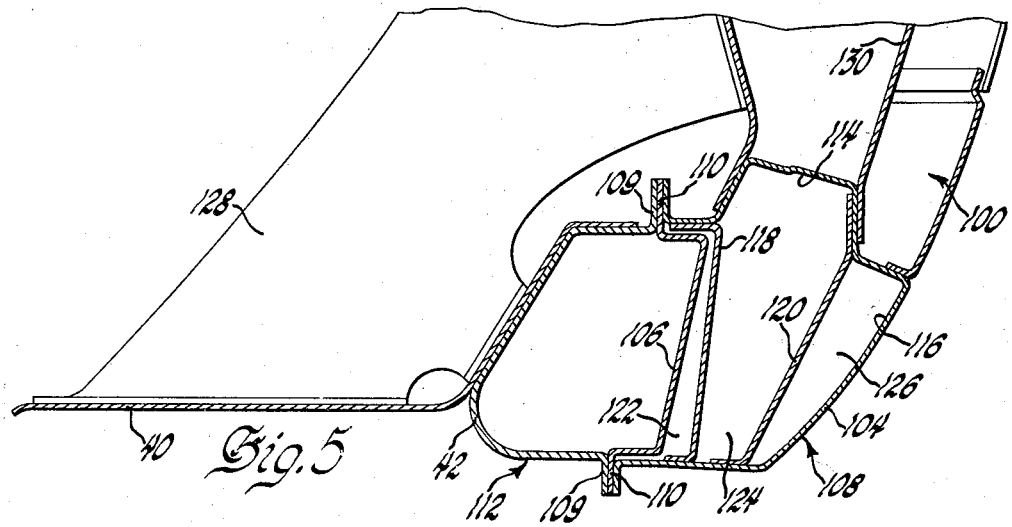
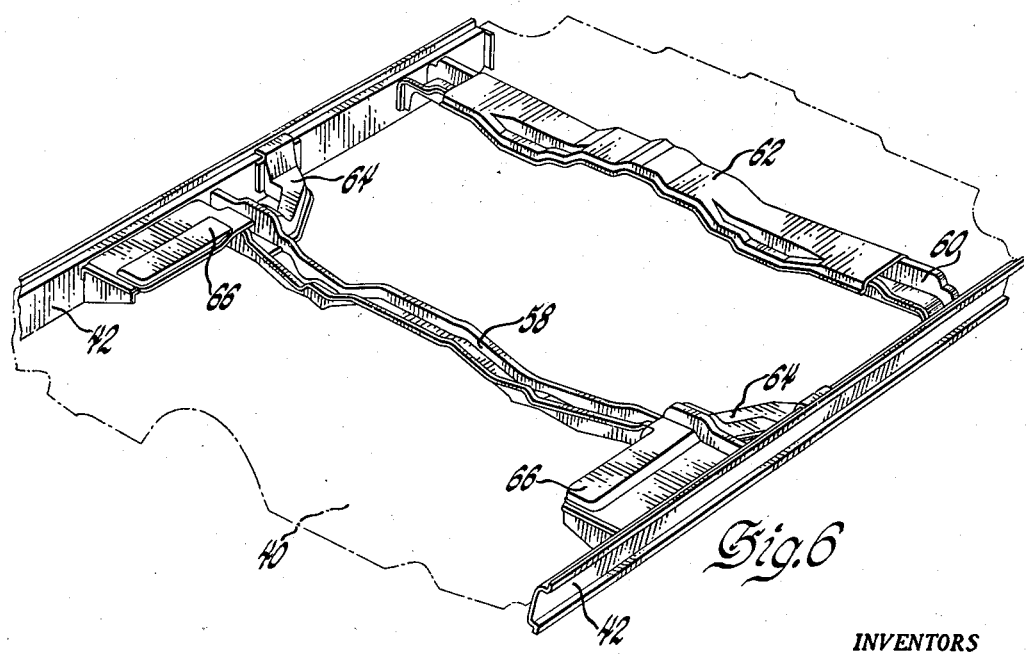

United States Patent Office 2,864,647
Patented Dec. 16, 1958

2,864,647

VEHICLE BODY-FRAME CONSTRUCTION

Gustave J. Chesna, Birmingham, Henry S. Kawecki, Ferndale, and Jules A. Olivier, Detroit, Mich., assignors to General Motors Corporation, Detroit, Mich., a corporation of Delaware Application October 12, 1956, Serial No. 615,617

8 Claims. (Cl. 296—28)

This invention relates to vehicle construction in general and more particularly to the construction of a vehicle underbody for use with a cruciform frame.

Vehicle construction has been slowly progressing from separate bodies and frames to the integral construction presently used by one well known automotive manufacturer. Despite the factors encouraging integral body-frame construction, many automotive manufacturers are reluctant to make the extensive change-over in their manufacturing and assembly procedures made necessary to fabricate and assemble integral body-frames.

The principal advantages of integral body-frame construction seem to be that a more sturdy body shell may be obtained without having a heavy and expensive frame and that the over-all vehicle height may be considerably reduced to lower the vehicle's center of gravity and provide better road handling qualities as well as to enable stylists to devise more aesthetic styling for greater sales appeal.

The disadvantages which seem to be discouraging most automotive manufacturers from changing over to the integral body-frame construction apparently include the expenses in changing their manufacturing facilities over, revamping the assembly line techniques and also revising their business structure to some extent since a running chassis would no longer be produced as such but only the separate running components. Another generally accepted disadvantage of the integral body-frame construction seems to be that any body damage may disrupt the running alignment of the vehicle and as a result other compensations are necessary which may tend to dissatisfy unfortunate customers who happen to have a minor accident with their car.

It is here proposed to introduce a vehicle construction which approaches the integral body-frame construction without entirely departing from the advantages of having the body and frame remain separate.

The proposed vehicle body-frame construction includes making use of a cruciform frame, having the frame rails converging centrally thereof, and a vehicle underbody which is formed to complement the cruciform frame and receive it within recesses formed in the underbody. It is proposed to so form the underbody that the vehicle frame rails as received therein extend along the drive shaft tunnel and to so form the lateral edges of the underbody as to provide adequate structural reinforcement therefor without undue weight.

The vehcile body itself is to include box-sectioned sill rails for supporting the body pillar posts and cooperating with the reinforced lateral edges of the underbody to provide double box-sectioned side rails along each side of the vehicle body. The side rails are also formed in a manner permitting additional sectioning therein to reinforce parts of the rails as for supporting the body pillar members.

In the drawings:

Figure 1 is a top plan view of the proposed vehicle body-frame combination showing the underbody with the cruciform frame disposed thereunder.

Figure 2 is a vehcile body mount as seen in the plane of line 2—2 of Figure 1, looking in the direction of the arrows thereon.

Figure 3 is another body mount as seen in the plane of line 3—3 of Figure 1, looking in the direction of the arrows thereon.

Figure 4 is a perspective view of the vehicle underbody having parts of the vehicle body secured thereto and other parts broken away and shown in cross section to better illustrate the disclosed construction.

Figure 5 is a cross-sectioned view of one of the vehicle body side rails as reinforced to support body pillar posts.

Figure 6 is a view of the vehicle underbody reinforcement showing the floor pan, in phantom, disposed thereover.

The proposed vehicle construction includes a cruciform frame 10 of the type disclosed by copending application Serial No. 612,021 entitled "Vehicle Frame" in the name of Harry M. Purdy and filed September 25, 1956. The frame has frame rails 12, 14, 16 and 18 converging centrally thereof and forming a drive shaft tunnel section 20 extending through the frame. A front suspension cross member 22 is secured between the forwardly extending frame rails 12 and 14 and a simple cross support 24 is secured across the terminal ends of the rearwardly extending rails 16 and 18.

Frame outriggers 26 and 28, secured to each side of the frame member, are the principal vehicle body supporting members with additional body supports 30, 32, 34, 36 and 38 disposed at other retaining positions on the frame.

The vehicle underbody includes a floor pan 40, of sheet metal and which is stamped as will be described, and which has elongated channel sectioned members 42 secured to the lateral edges thereof and opening outwardly. These channel members 42 need not be of as heavy stock as is usually used for channel frame rails for reasons which will later be more apparent.

A centrally disposed and laterally extended tunnel section 44 is formed within the floor pan 40 as are recessed portions adapted to complement the vehicle frame 10 in order to receive the frame therein; or conversely, to allow the pan to be received about and within the frame. The recessed portions which are complementary to the frame are shown as raised portions 46 and 48 in the drawings, and portion 50, because of the overhead view taken.

The frame rail receiving portions 46 and 48 of pan 40 extend along each side of the tunnel section 44 and are convergent with the frame rails 12 and 14 as well as contiguous with the tunnel section. The rail receiving portion 50 of the floor pan extends transversely across the pan and is formed in a manner serving as a seat raiser; in this connection a seat receiving ridge 52 is also formed thereon.

In order to provide transverse strength to the floor pan there are transverse raised portions 54 and 56 formed therein which are adapted to receive transverse braces 58 and 60. These braces are secured to the channel sectioned lateral members 42 as best shown in Figure 6. The braces are preferably channel sectioned and opening upwardly in order that they may be closed by the pan member to form box-sectioned beams. The brace 60 will be noted to include a cover plate 62 secured thereover but the ends are closed by the pan.

Other structural bracing such as the center pillar support braces 64 and the front seat adjuster supports 66 are also shown in Figure 6.

By permitting the braces 58 and 60 to be received in the underside of the transverse raised portions 54 and 56, the braces are allowed to cross over the drive shaft tunnel area without any further obstruction than the existing tunnel height offers. It should also be noted that the outriggers 26 and 28, which are secured to the frame 10, though extending rearwardly of the frame, are matched by the transverse braces.

In this regard, the braces 58 and 60 are formed to extend rearwardly with the outriggers rather than straight across the pan. This enables the outriggers to be secured transversely of the frame rails and for the transversely extending pan brace 58 to be disposed forwardly of the frame tunnel section 20, as well as providing a more structurally sound reinforcement pattern in combination with the frame member.

Transverse and lateral strengthening beads 68 and 70, respectively, may also be formed in the floor pan as is shown best by Figure 4.

The underbody may include, or have secured thereto, the toe board portion 72 shown in Figure 1. The front end of the pan may then be secured to the frame member 10 by the supports 30 and 32 or by the frame brace 73 secured between the forwardly extending rails 12 and 14, intermediate their ends, and curved upwardly out of the way of the vehicle drive shaft (as best shown in the aforementioned copending application on the frame), or the front end of the underbody may be secured to the frame member by both means.

The body mounts are shown by Figures 2 and 3. In Figure 2 the transverse brace 60, closed by cover and reinforcing plate 62, is shown disposed up within the recessed portion 50 of the pan 40. The outrigger 28 is shown secured to the brace by a bolt 74 and captive nut 76 with mounting blocks 78 and 80 disposed on opposite sides of the outrigger to minimize the metal-to-metal contact at the body mounting.

Figure 3 shows a body mount located near the rear of the vehicle and including the end of frame rail 16 and rear cross member 24, with the captive nut 82 fixed to the underside of the rear compartment floor pan 84 and the bolt 86 extending through part of the frame rail.

The after end of the floor pan 40 is either formed upwardly to provide, or has secured thereto, a rear seat back wall 88. The back wall is reinforced by raised and depressed portions 90 and 92 formed in the wall and which serve other purposes not pertinent to this disclosure.

The rear compartment floor pan 84 is shown as secured to the passenger compartment pan 40 at the edge of the back wall 88, and to extend rearwardly. The rear pan member is depressed centrally as at 94, between the rearwardly extending frame rails 16 and 18, and provides a vertical wall 96. The tire well 98 is shown as formed within the depressed pan portion 94.

The vehicle body member, which is to be secured to the underbody, includes the body pillar posts, only two of which are shown, 100 and 102. The pillar posts have a channel sectioned rocker panel 104 secured across their terminal ends. The rocker panels open inwardly of the vehicle but are closed by elongated channel sectioned members 106 which are formed to complement the channel members 42 along the lateral edges of pan 40. This forms a box-sectioned sill member 108 for the body. The complementary channel members 42 and 106 are also secured together, in the assembly of the underbody to the body, by the cooperative flanges 109 and 110 of the respective members. This forms a box-sectioned side rail 112 along the lateral edges of the floor pan 40 and, with the sills 108, forms a double box-sectioned member along each side of the vehicle body.

The channel sectioned rocker panels 104 also include channel portions such as 114 and 116, which, with plates 118 and 120 secured therein, produce the box-sections 122, 124 and 126 coextensive with the side rail 112.

The center body pillar post 100 is shown to include a reinforcing support 128 secured to the floor pan and extending upwardly with the pillar post and in bracing relation thereto. The pillar post and the support are shown to include channeled sections having a plate 130 secured therebetween to provide a vertical double box-sectioned support similar to that horizontal support provided by the side rail and sill combination.

The vehicle body-frame combination is preferably manufactured and assembled in the following general sequence.

The channel members 42 are secured together by the braces 58 and 60 and the floor pan 40 is secured to the reinforcing framework, after having been stamped to include the tunnel section 44, frame rail receiving portions 46, 48 and 50, transverse raised portions 54 and 56 and strengthening beads 68 and 70. The vehicle body is built up to include the sill members 108 as previously described. The underbody is then assembled to the rest of the body by securing the channel members 42 and 106 together.

The underbody and body, as assembled, are then ready to be lowered upon the vehicle frame 10 and in so doing the frame will be received within the complementary recesses formed in the pan and the outriggers and other supports will be aligned with the braces and other members to which they are to be secured.

We claim:

1. In combination with a cruciform vehicle frame having frame rails converging centrally thereof, a vehicle underbody receivable upon said frame and comprising a floor pan having reinforced box-sectioned sills formed along the outer edges thereof, a raised portion formed from said floor pan centrally and longitudinally thereof for receiving vehicle drive means therein, a raised portion formed from said pan at the rear and transversely of said first-mentioned raised portion and extending across said pan between said sills, a structural floor pan brace received within said transverse raised portion and secured to said sills, and depressed floor areas formed from said pan between the limits defined by said raised portions, said sills and said converging frame rails disposed under said pan.

2. The combination provided for by claim 1 having said transverse raised portion formed within the area receiving a vehicle seat thereover.

3. The combination of a cruciform vehicle frame having frame rails converging centrally thereof from opposite ends of said frame and a vehicle underbody comprising a floor pan having a raised portion formed therefrom and extended centrally thereof the length of said pan, converging raised portions formed from said floor pan at one end thereof and along opposite sides of said first-mentioned raised portion, said converging raised portions being cooperatively disposed to receive the forwardly extending of said frame rails, and a transversely extended raised portion formed from said pan across the other end thereof and contiguous with the end of said first-mentioned raised portion for receiving the rearwardly extending of said frame rails.

4. The combination provided for by claim 3 including box-sectioned sill members formed along opposite edges of said pan and transverse braces secured to and extended between said sill members, one of said braces being received with said rearwardly extending frame rails within said transversely raised portion of said floor pan.

5. The combination provided for by claim 3 including box-sectioned sill members formed along opposite edges of said pan and transverse braces secured to and extended between said sill members, a second transversely extended raised portion formed from said pan and spaced apart from said first-mentioned transverse raised portion, said transversely extended raised portions being each disposed in a vehicle seat receiving position, and separate of said braces received within separate of said transversely extended raised portions.

6. A vehicle frame and underbody combination comprising a cruciform frame having frame rails converging centrally thereof, outwardly projecting support brackets secured to said frame rails and extending substantially normal thereto and rearwardly of said frame, said underbody including a floor pan having box-sectioned sill members provided laterally thereof, a transverse raised portion formed from said floor pan between said sill members and having the outer ends therein inclined rearwardly, channel sectioned braces secured within the ends of said raised portion and closed against said pan, said raised portion with said braces being cooperatively disposed relative to said support brackets and receiving said brackets therein, and means for securing said brackets to said braces and tying said sill members together.

7. A vehicle body for use with a cruciform frame having frame rails converging centrally thereof and which comprises, a floor pan having recessed portions formed in the underside thereof complementary with and adapted to receive said frame rails therein, first and second complementary channel sectioned members provided along the lateral edges of said floor pan to form first box sections, channel sectioned sill members disposed to complement said first-mentioned channel sectioned members and secured thereto to provide box-sectioned body side rails containing first box sections, said sill members including body pillar posts in assembly therewith, and transverse structural reinforcement means formed with said floor pan and connecting said side rails to said frame rails.

8. A vehicle body for use with a cruciform frame having frame rails converging centrally thereof and which comprises, a floor pan having recessed portions formed in the underside thereof complementary with and adapted to receive said frame rails therein, channel sectioned members provided along the lateral edges of said floor pan, channel sectioned sill members disposed to complement said first-mentioned channel sectioned members and secured thereto to provide box-sectioned body side rails, longitudinally extending channel sectioned and plate bracing members received intermediate said complementary channel sectioned members and secured thereto to form a plurality of box subsections internally of said side rails, transverse channel sectioned braces secured to said side rails and extended therebetween, said braces being closed at least in part by having said floor pan secured thereto, and transverse recessed portions formed in the underside of said floor pan complementary with and adapted to receive said braces therein.

References Cited in the file of this patent

UNITED STATES PATENTS

| | | |
|---|---|---|
| 2,268,291 | Ledwinka et al. | Dec. 30, 1941 |
| 2,431,524 | Ulrich et al. | Nov. 25, 1947 |
| 2,711,340 | Lindsay | June 21, 1955 |

FOREIGN PATENTS

| | | |
|---|---|---|
| 742,977 | Germany | June 17, 1944 |
| 891,200 | Germany | Sept. 24, 1953 |

OTHER REFERENCES

Hansa Borgward illustration in "The Autocar" magazine, vol. XCVII, No. 2960, of Aug. 22, 1952, page 1042.

UNITED STATES PATENT OFFICE
CERTIFICATE OF CORRECTION

December 16, 1958

Patent No. 2,864,647

Gustave J. Chesna et al.

It is hereby certified that error appears in the printed specification of the above numbered patent requiring correction and that the said Letters Patent should read as corrected below.

Column 1, line 63, and column 2, line 3, for "vehcile", each occurrence, read -- vehicle --; column 5, line 8, for "therein" read -- thereof --.

Signed and sealed this 16th day of June 1959.

(SEAL)
Attest:

KARL H. AXLINE
Attesting Officer

ROBERT C. WATSON
Commissioner of Patents